United States Patent
Lu et al.

(10) Patent No.: US 7,126,915 B1
(45) Date of Patent: Oct. 24, 2006

(54) NETWORK TRAFFIC REGULATION

(75) Inventors: Xiaolin Lu, Middletown, NJ (US); Xiaoxin Qiu, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/474,032

(22) Filed: Dec. 28, 1999

(51) Int. Cl.
*H04J 1/16* (2006.01)
*H04J 3/14* (2006.01)

(52) U.S. Cl. ............. 370/235; 370/230; 370/236; 370/468; 370/445

(58) Field of Classification Search .......... 370/252, 370/256, 265, 268, 465, 468, 437, 477, 235, 370/230, 230.1, 395.2, 395.21, 395.4, 395.41, 370/348, 431, 236, 445, 447, 448
See application file for complete search history.

(56) References Cited

U.S. PATENT DOCUMENTS

| | | | | |
|---|---|---|---|---|
| 5,436,902 A | * | 7/1995 | McNamara et al. | 370/447 |
| 6,011,804 A | * | 1/2000 | Bertin et al. | 370/468 |
| 6,046,980 A | * | 4/2000 | Packer | 370/230 |
| 6,072,773 A | * | 6/2000 | Fichou et al. | 370/230 |
| 6,104,700 A | * | 8/2000 | Haddock et al. | 370/235 |
| 6,167,027 A | * | 12/2000 | Aubert et al. | 370/230 |
| 6,175,570 B1 | * | 1/2001 | Cukier et al. | 370/414 |
| 6,324,184 B1 | * | 11/2001 | Hou et al. | 370/468 |
| 6,377,548 B1 | * | 4/2002 | Chuah | 370/233 |
| 2001/0012272 A1 | * | 8/2001 | Aubert et al. | |
| 2002/0057709 A1 | * | 5/2002 | Edmon et al. | |

* cited by examiner

*Primary Examiner*—Ajit Patel (57) ABSTRACT

The invention provides a traffic regulation technique for media that functions within access protocols by making a percentage of total communication capacity of the media unavailable to end-users as reserve capacity. This reserve capacity is released when appropriate to regulate network traffic. Thus, the traffic regulation technique regulates the traffic by adjusting the percentage of reserve capacity. The reserve capacity may be targeted to a specific type of traffic. In this way, the traffic of the communication system 10 may be regulated so that desired quality of service may be provided for specific end users.

18 Claims, 9 Drawing Sheets

NETWORK TRAFFIC REGULATION

BACKGROUND OF THE INVENTION

1. Field of Invention

The invention provides methods and apparatus for network traffic regulation.

2. Description of Related Art

Many network traffic control techniques rely on network access protocol features such as assigning priorities, adjusting collision back off delays, and dedicating pre-assigned channels, for example. These network traffic control techniques are tightly integrated with media access mechanisms and inherit their complexities. Thus, there is a need for new network traffic control technology.

SUMMARY OF THE INVENTION

The invention provides a traffic regulation technique for media that functions within access protocols by making a percentage of total communication capacity of the media unavailable. For example, in a network, multiple terminals may be interconnected to provide communication among the terminals up to a maximum capacity. The traffic regulation technique regulates the traffic by removing, as the reserve capacity, a percentage of this maximum capacity. This reserve capacity is released when appropriate to regulate network traffic. Thus, the traffic regulation technique regulates the traffic by adjusting the percentage of reserve capacity.

The reserve capacity may be targeted to a specific type of traffic. For example, a certain class of communication may have a lesser percentage of the total capacity made unavailable as compared to other classes of communication. In this way, the traffic of the communication system may be regulated so that desired quality of service may be provided for specific end users.

BRIEF DESCRIPTION OF THE DRAWINGS

The invention is described in detail with reference to the following figures wherein like number designated like elements, and wherein.

DETAILED DESCRIPTION OF PREFERRED EMBODIMENTS

Figure 1:
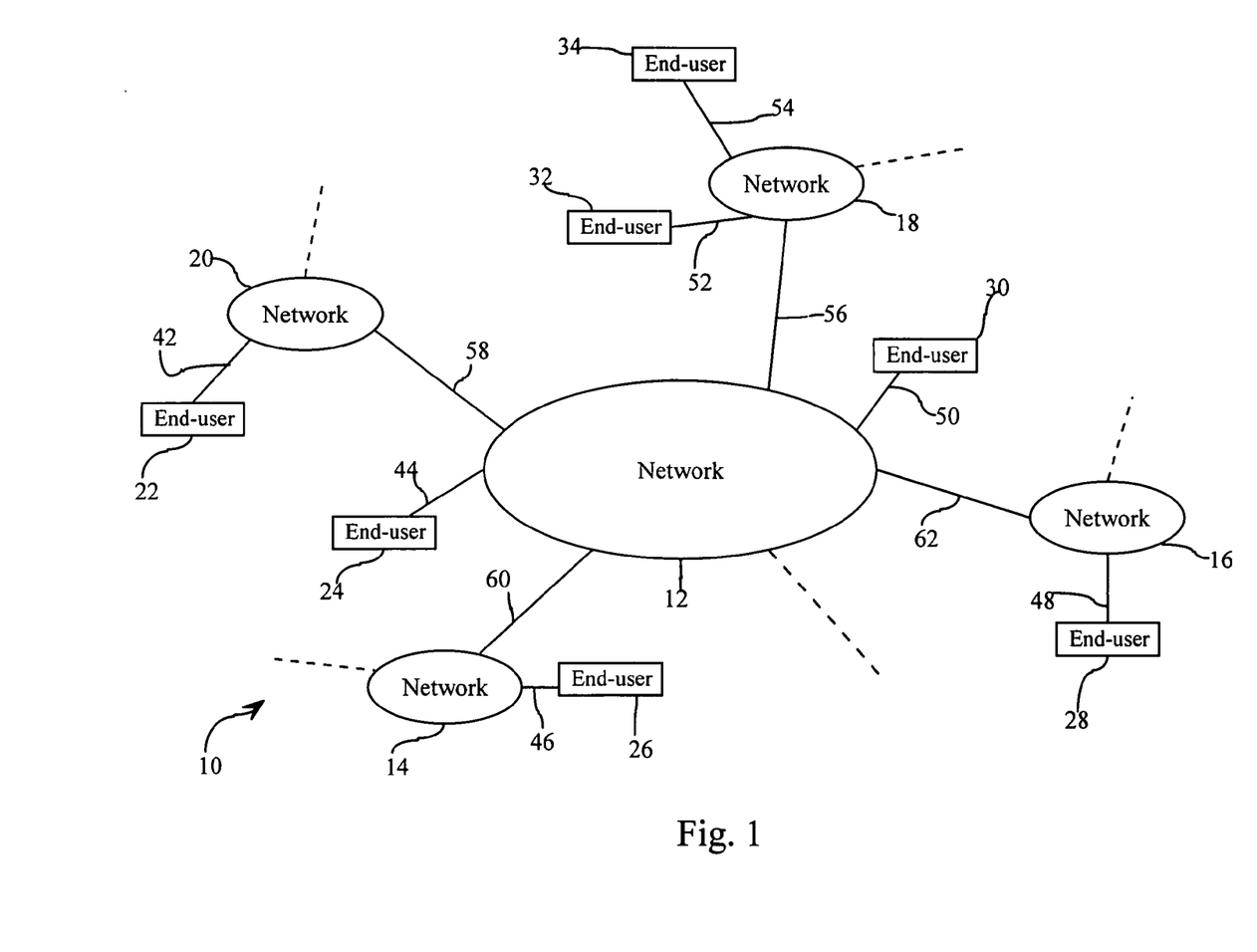
FIG. 1 shows a communication network.

FIG. 1 shows a communication system 10 that includes networks 12–20 that provide communication services to end-users 22–34. Any of the networks 12–20 may be wired or wireless networks operating under various protocols to provide communication services to the end-users 22–34. The networks may themselves be treated as a single end-user so that the network 20 may be required to gain access (via a server, for example) to services provided by the network 12, for example.

The end-users 22–34 are coupled to respective networks via connections 42–54 and the networks 14–20 are coupled to the network 12 via connections 56–62. When providing communication services, the communication system 10 may experience traffic congestion in any of the connections 42–62. The communication traffic across the connections 42–62 may be regulated to resolve network congestion, to provide special services such as guaranteed communication qualities, or to optimize network functions, for example.

The invention provides a traffic regulation technique that does not change the access protocols associated with any of the connections 42–62. Instead, the traffic regulation technique makes unavailable a percentage of the total communication capacity as reserve capacity of the networks 12–20 and connections 42–62. The traffic regulation technique regulates the traffic in the communications system 10 by adjusting the amount of reserve capacity in the communication system 10 based on system parameters and current traffic conditions.

The percentage of reserve capacity may be targeted to a specific type of traffic. For example, a certain class of communication may have a larger percentage of reserve capacity as compared to other classes of communication. In this way, the traffic of the communication system 10 may be regulated so that desired quality of service may be provided for end-users 22–34.

For example, assume that a guaranteed quality class end-user 34 is transferring information to end-user 26 via connections 54, 56, 60, 46, and network 12. At the same time, end-users 22, 24, 28, 44, 50 and 52 are engaged in a transmission intensive activity such as large file transfers, for example. End-users 24 and 30 are servers having class A (privileged) direct access to the network 12 and end-users 22, 28 and 32 have class B (non-privileged) access to the respective networks 20, 16 and 18. Thus, to enforce the guaranteed quality to end-user 34, the traffic on connections 44, 50, 52, 58 and 62 must be regulated to reduce corresponding traffic so that sufficient bandwidth may be provided to the end-user 34 for the guaranteed quality.

The traffic on connections 52, 58 and 62 may be regulated by increasing the percentage of reserve capacity over these connections. The traffic over connections 44 and 50 may be reduced (if they affect the end-user 34 communication quality) by reducing bandwidth for class A end-users. Thus, by regulating traffic over specific connections, the communication system 10 may be controlled to provide various quality of services for end-users 22–34.

Figure 2:
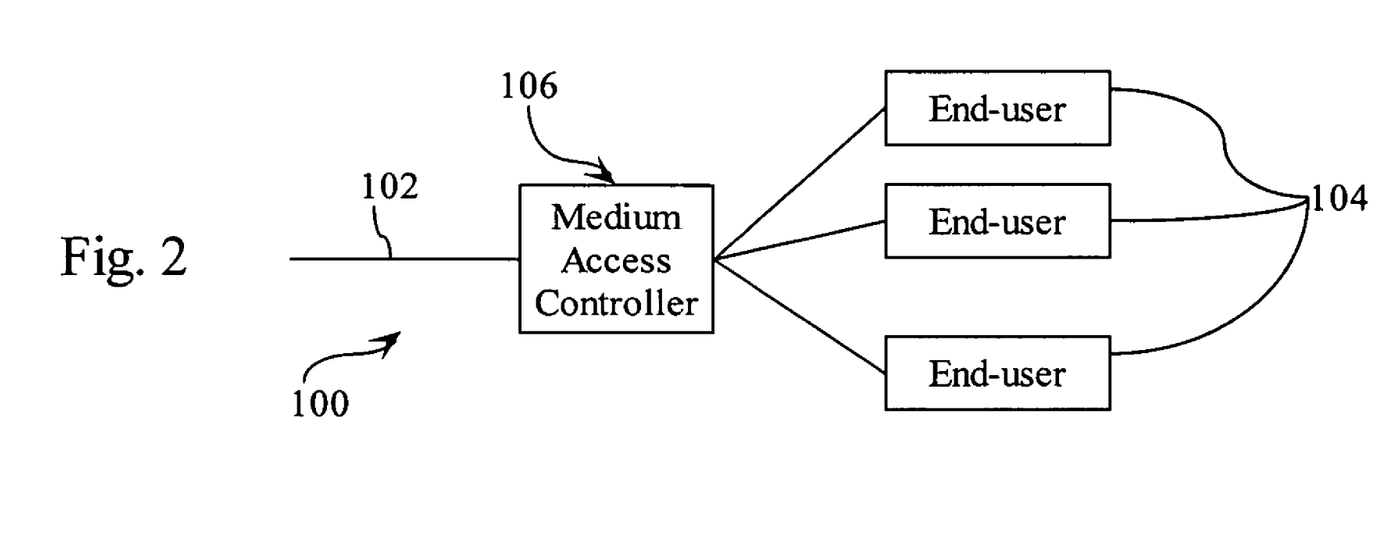
FIGS. 2–3 show examples of different networks.
Figure 3:
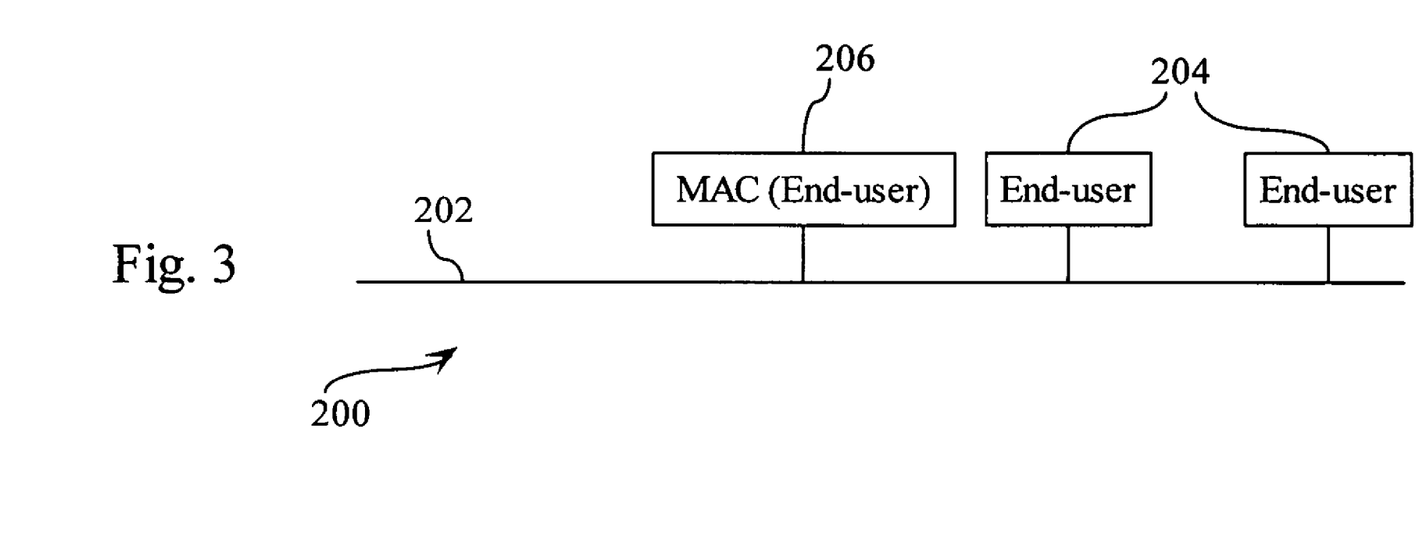
Figure 4:
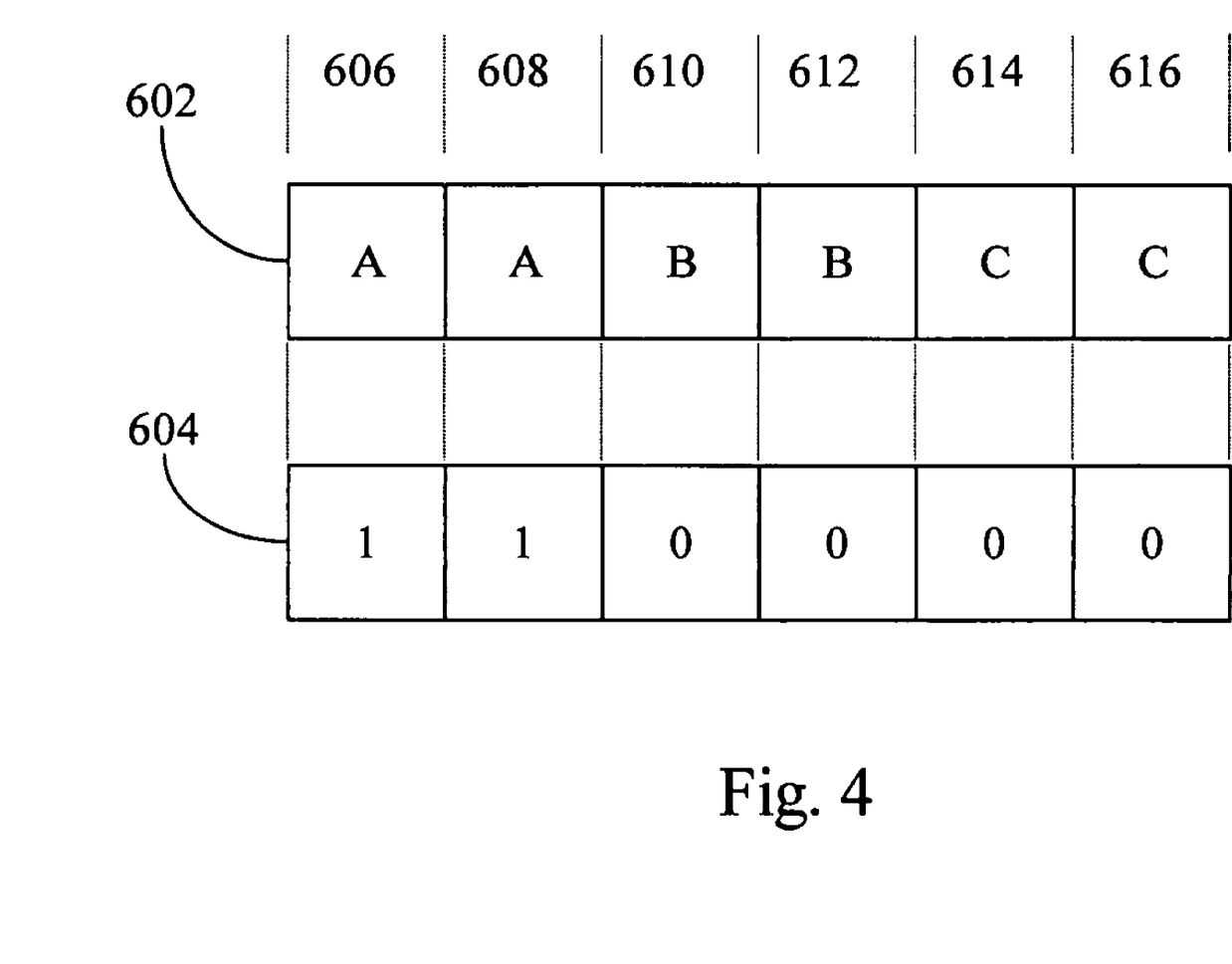
FIG. 4 shows a scheme for direct traffic control of a specific traffic class.

FIGS. 2–4 show three examples of network architectures that may be regulated by the traffic regulation technique. FIG. 2 shows a star configuration where end-users 104 gain access to communication media 102, such as a wired media or an optical media, through a media access controller (MAC) 106. The MAC 106 may implement any appropriate access protocol. For example, if collision detection multiple access (CDMA) protocol is used, the MAC 106 returns a collision signal to the end-users 104. Thus, when a first end-user 104 accesses the communication media 102 and a collision signal is not returned by the MAC 106, then the first end-user 104 has successfully gained access to the communication media 102. However, if a collision signal is received from the MAC 106 (i.e., a second end-user 104 also attempted access), then the first end-user 104 has not successfully gained access because at least one other end-user 104 also attempted to gain access to the communication media 102. When access is not successful, the end-users 104 stops any further transmission of data and attempts to gain access to the communication media 102 at a later time.

For the above-described network 100, the MAC 106 may reserve capacity of the communication media 102 by returning collision signals for a desired percentage of time in addition to "actual" collision among end-users 104. In this way, a percentage of the total capacity of the communication media 102 may be reserved and the amount of reserve capacity may be adjusted as necessary to achieve traffic regulation purposes.

FIG. 3 shows a second type of network 200 where end-users 204 are connected directly to communication media 202. For example, such a network 200 may be a single coaxial line where end-users 204 are coupled to the coaxial line via taps.

The end-users 204 may gain access to the communication media 202 by using an out-of-band signaling channel where the end-users 204 compete for access to the communication media 202. In such a process, each of the end-users 204 that desires access to the communication media 202 asserts access bits. If an end-user 204 receives the asserted access bits, then the end-user 204 has gained access to the communication media 202. Traffic in the above-described network 200 may be regulated by assigning one of the end-users 204 to perform a MAC function. The end-user 204 may exclusively perform MAC functions (e.g., a MAC device) or may perform the MAC functions as one of the functions of the assigned end-user 204. Such an end-user 204 is hereinafter referred as a MAC 206.

The MAC 206 may regulate the traffic by asserting traffic regulation signals to block other end-users 204 from gaining access to the communication media 202. For example, FIG. 4 shows an example access sequence 602 that includes six access slots 606–616. Access slots 606 and 608 may be allocated to class A end-users 204, access slots 610–612 may be allocated to class B end-users 204 and access slots 614–616 may be allocated to class C end-users 204. During contention for the communication media 202, each of the class A, B, C end-users 204 output access bits, for example, in respective slots. If a contending end-user 204 receives the same access data as transmitted, then the end-user 204 has successfully gained access to the communication media 202 and may begin transmission of data in an appropriate manner on the communication media 202. The MAC 206 may regulate the traffic on the communication media 202 for particular class end-users 204 by making unavailable access slots of any of the classes. For example, the MAC 206 may assert an access sequence 604 that blocks class A end-users 204 from acquiring access to the communication media 202. The MAC 206 may assert a highest-priority access sequence in slots 606 and 608. Similarly, the MAC 206 may assert traffic regulation signal in any of the access slots 606–616 so that traffic for all end-user classes on the communication media 202 may be regulated.

Figure 5:
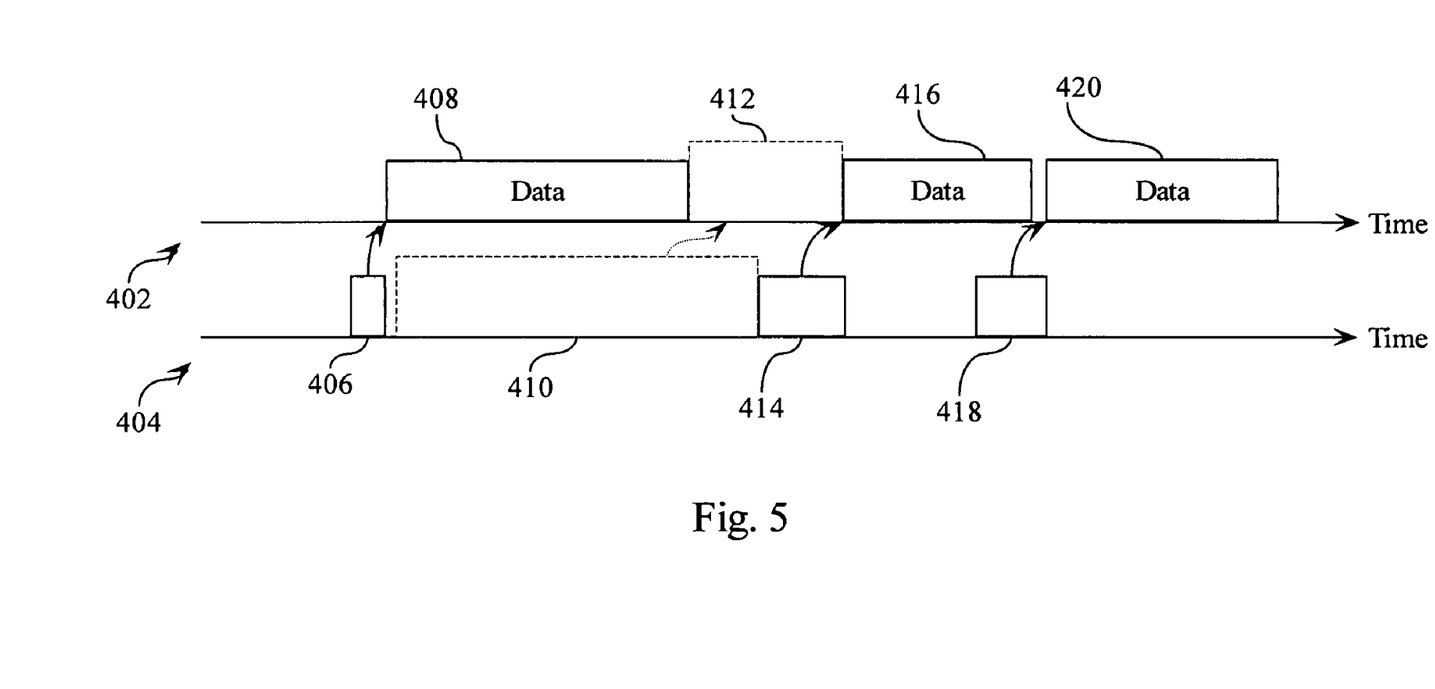
FIGS. 5–7 show examples of direct traffic control.

FIG. 5 shows a timeline diagram 402 of communication traffic over a communication channel such as may be supported by the communication media 102 and 202 as discussed in connection with FIGS. 2 and 3 above. FIG. 5 also shows a timeline 404 of a signaling channel over which end-users 104 or 204 contend for the communication channel. The end-users 104, 204 contend on the signaling channel for the communication channel at contention periods 406, 414 and 418, as shown in the timeline 404. As indicated by respective arrows, the contention period at 406 results in transmission period 408 over the communication channel as shown in timeline 402. Similarly, contention periods 414 and 418 result in data transmission periods 416 and 420. As shown in the signaling channel timeline 404, a time period 410 is made unavailable by the MAC 106, 206 as indicated by the dashed lines. The removal of the time period 410 from the signaling channel prevents any of the end-users 104, 204 from gaining access to the communication channel during the time period 410 which results in a time period 412 in timeline 402 when no transmission occurs. Thus, the MAC 106, 206 regulates the traffic over the communication channel by making the time period 410 unavailable or reserved on the signaling channel.

As shown in FIG. 5, the amount of unavailable capacity over the communication channel is directly related to the reserve capacity in the signaling channel. However, the amount of reserve capacity in the signaling channel does not result in the same amount of reserve capacity in the communication channel because the amount of data being transmitted by successfully contending end-user 104, 204 may vary. Thus, the MAC 106, 206 need to monitor the amount of unused capacity of the communication channel to determine whether adjustments of signaling channel reserve capacity is required. Other techniques may also be used, such as determining the size of the time period 408 by listening to the signaling channel during the period 406 to extract access request information such as the amount of data to be transferred. If in-band contention is used, then the MAC 106, 206 may control the amount of reserve capacity by directly making the communication channel unavailable for the desired amount.

Figure 6:
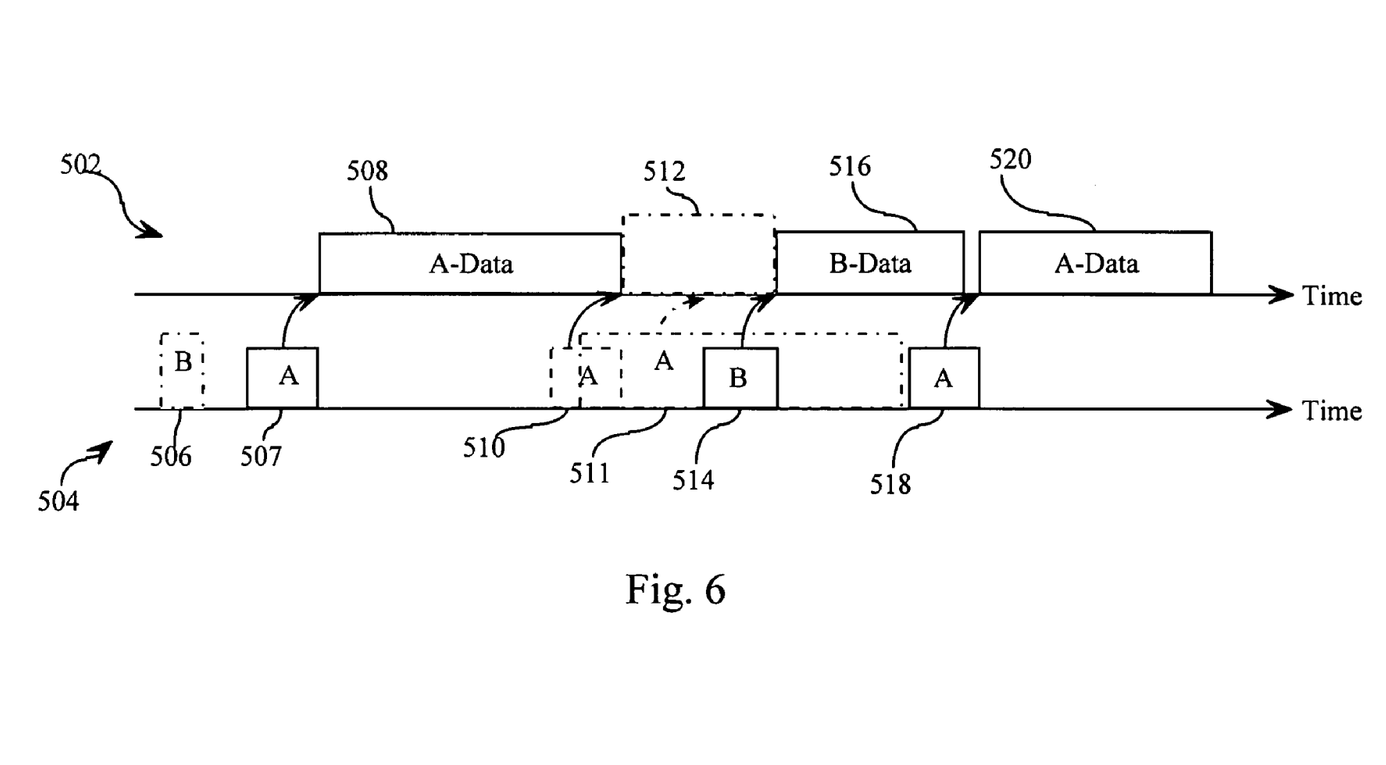

FIG. 6 shows an example of the MAC 106, 206 making unavailable communication channel capacity for particular classes of users. Timeline 502 is a communication channel timeline while timeline 504 is a signaling channel timeline. As before, time periods 507, 514 and 518 results in communication channel traffic time periods 508, 516 and 520. As shown in timeline 504, the MAC 106, 206 makes unavailable time periods 506 and 511 for class B and class A end-users 104, 204, respectively. As shown in FIG. 6, class A end-users 104, 204 attempt to gain access to the communication channel during time periods 507, 510 and 518. However, a portion of the time period 510 overlaps the time period 511 when the MAC 106, 206 asserts unavailability control signals for class A end-users 104, 204. Thus, contending class A end-users during the time period 510 lose the contention and thus are prevented from transmitting data during the time period 512 over the communication channel. However, class B end-users 104, 204 may successfully contend for access to the communication channel during time period 514 even though the MAC 106, 206 is asserting the unavailability control signals for class A end-users 104, 204. In this way, the MAC 106, 206 may regulate traffic for a specific class of users without affecting traffic of other class end-users 104, 204.

Figure 7:
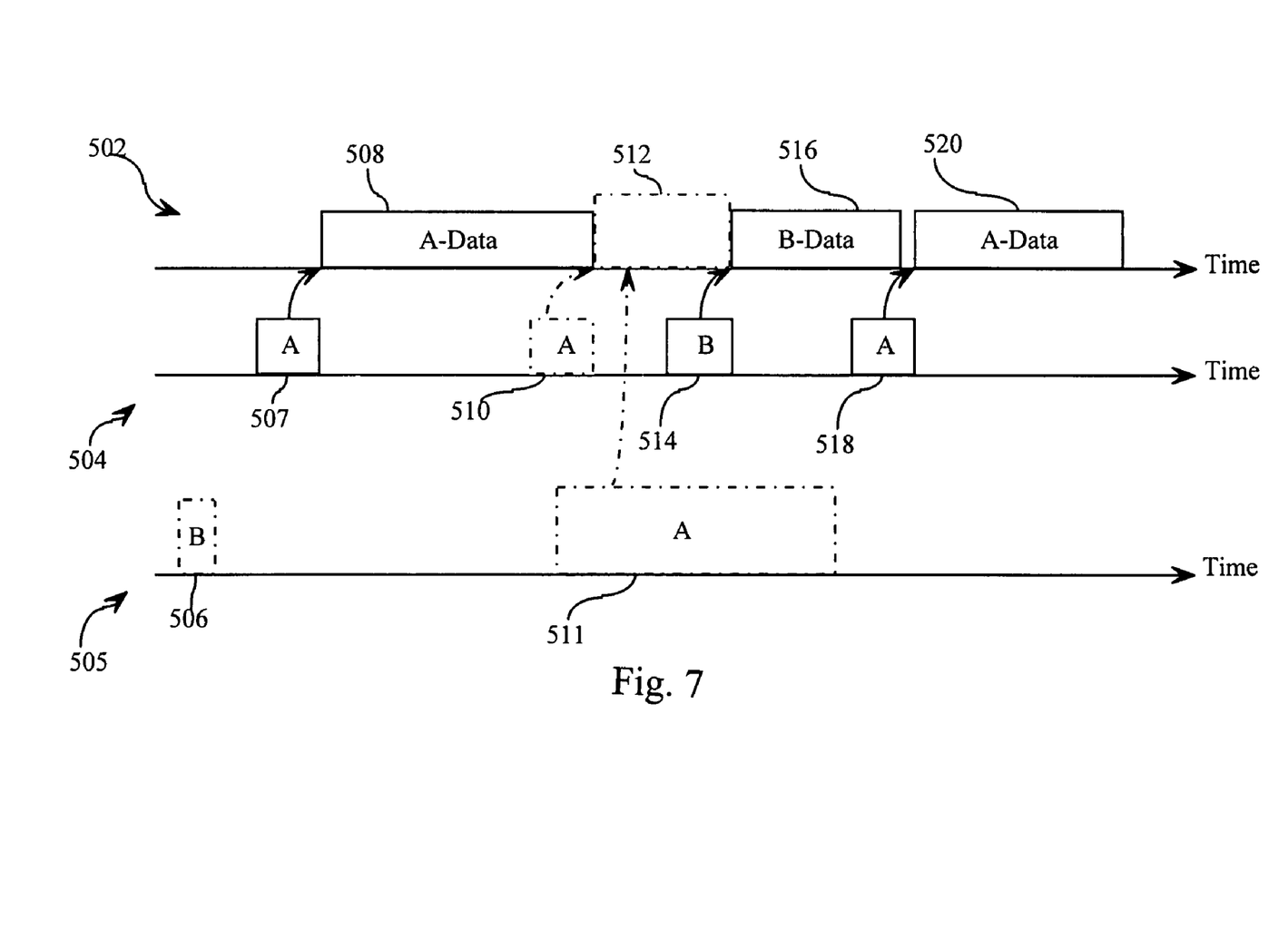

FIGS. 5 and 6 show the MAC 106, 206 asserting traffic regulation controls over the signaling channel to reserve capacity. FIG. 7 shows the same traffic conditions as FIG. 6 except that the MAC 106, 206 asserts traffic control signals over a separate traffic regulation channel as shown in timeline 505. All the end-users 104, 204 listen to the traffic regulation channel and attempt to gain access only during those periods when traffic regulation signal are not present.

The traffic regulation techniques discussed above provides the mechanisms by which network traffic may be controlled. The MACs 106, 206 of respective networks may coordinate with each other based on system parameters to achieve traffic regulation goals. For example, one of the MACs 106, 206 may be designated a master and issue traffic regulation commands to all the other MACs 106, 206 so that system wide traffic regulation goals may be achieved. Alternatively, the MACs 106, 206 may each receive traffic monitoring information and based on the received monitoring information and system traffic regulation parameters, regulate traffic of the respective network accordingly. A further alternative may be to centralize traffic regulation in a dedicated traffic regulation unit that is not a MAC 106, 206.

Figure 8:
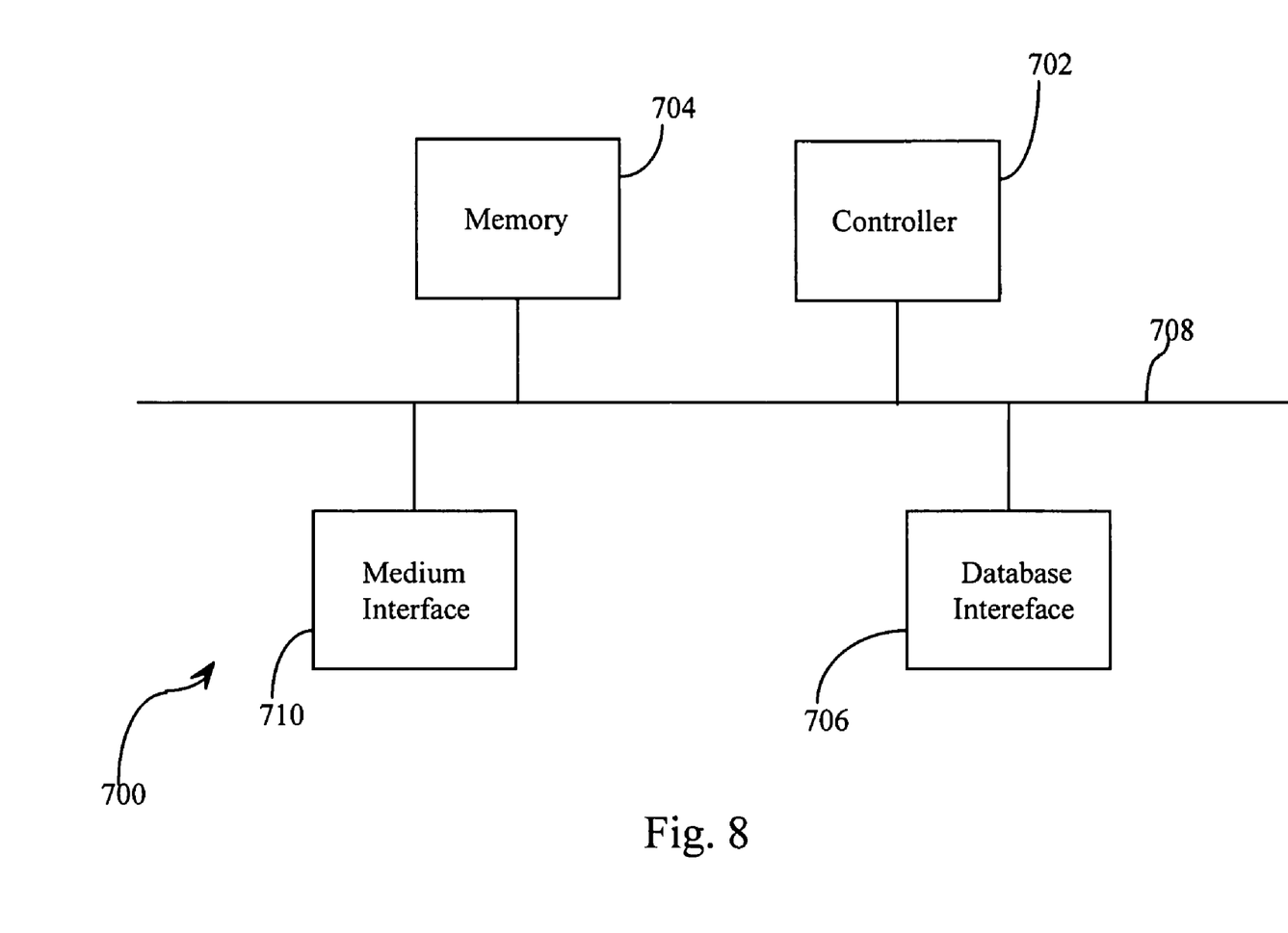
FIG. 8 shows an exemplary block diagram of a traffic regulator.

FIG. 8 shows an exemplary block diagram for a MAC 700 that is representative of the MAC 106, 206. The MAC 700 includes a controller 702, a memory 704, a media interface 710 and a database interface 706. The above components are coupled together via signal bus 708. While a bus architecture is illustrated, other architectures are possible as is well known to one of ordinary skill in the art.

The media interface 710 may interface directly with a media communication channel when in-band traffic regulation is used, interface with a signaling channel when an out-of-band traffic regulation is used, or interface with a traffic regulation channel that is independent of the communication channel or a signaling channel. The database interface 706 interfaces with a database that may include parameters that specify percentage of communication network capacity that is to be reserved and other parameters that may be required to perform the traffic regulation function. The above parameters may also be received via the media interface 710 or other interfaces that may be provided which permit reception of control parameter information.

When the MAC 700 first begins operation, the controller 702 initializes the traffic control parameters based on information received from the database interface 706 (or alternatively from one or more other control information sources) and begins monitoring the communication media for a preset time period based on the control parameters. For example, if the traffic regulation control parameters specify that 20% of the total capacity of the communication media should be reserved, the controller 702 may monitor the communication media via the media interface 710 to determine whether actual traffic volume requires intervention to meet the required 20% reserve requirement. If intervention is required, the controller 702 may enforce the 20% reserve requirement by asserting traffic regulation control signals either in the communication channel for in-band traffic regulation, the signaling channel for out-of-band traffic control regulation; or an independent traffic regulation channel, as discussed above. The traffic regulation control signal may be asserted through the media interface 710, for example.

Figure 9:
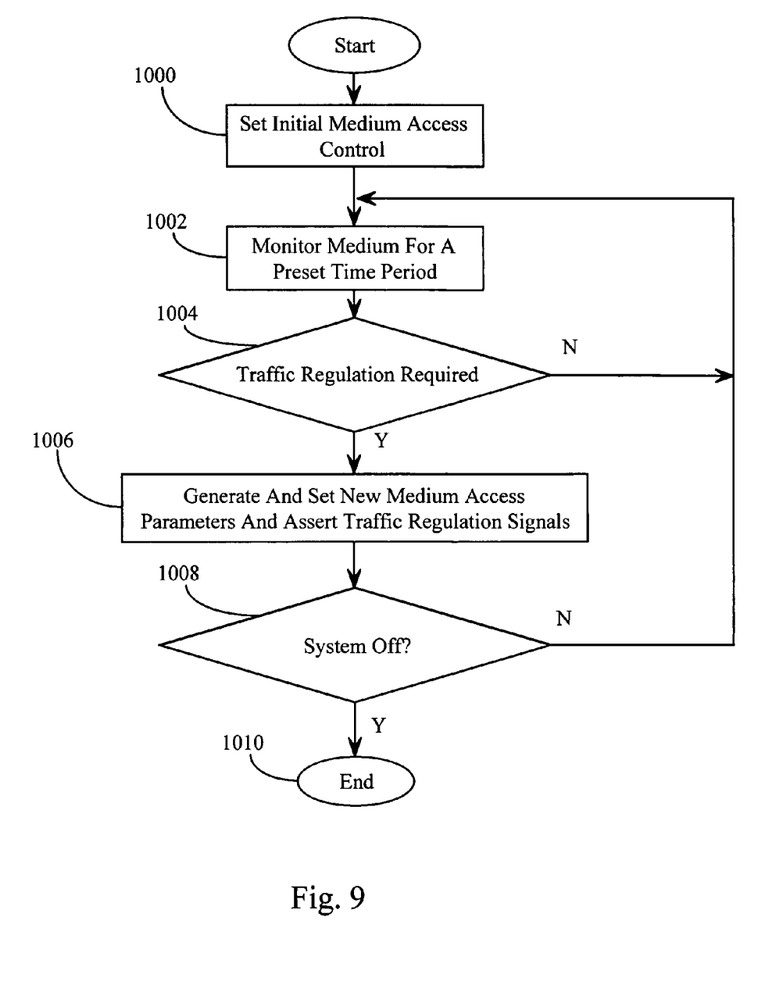
FIG. 9 shows a flowchart of a process of the traffic regulator.

FIG. 9 shows an exemplary flowchart of the traffic regulation process of the MAC 700. In step 1000, the controller 702 receives traffic control regulation parameters from a database via the database interface 706 and initializes media access control parameters in the memory 704 and goes to step 1002. In step 1002, the controller 702 monitors the media for a preset time period based on the control parameters in the memory 704 via the media interface 710, and the controller 702 goes to step 1004. In step 1004, the controller 702 determines whether traffic regulation of the communication media is required. If required, the controller 702 goes to step 1006; otherwise, the controller 702 returns to step 1002.

In step 1006, the controller 702 generates the appropriate traffic regulation control signals and asserts those control signals in the appropriate manner whether in-band, out-of-band or independent traffic regulation channels, and goes to steps 1008. In step 1008, the controller 702 determines whether the communication system 10 is to be turned off. If the system 10 is to be turned off, the controller 702 goes to step 1010 and ends the process; otherwise, controller 702 returns to step 1002 and continues to monitor the traffic of the communication media.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A method for regulating traffic in a network, the network including media access protocols having contention signals used to indicate that a particular user seeks access to the network, the method comprising:
   making unavailable an amount of network transmission capacity as reserve capacity, by blocking end-users from gaining access to the network by asserting the contention signal in a channel of the network, while no particular user seeks access to the media; and
   adjusting the amount of reserve capacity based on a desired network performance.

2. The method of claim 1, wherein the contention signal blocks all end-users or end users of a specific class, the class being defined by one or more of priority, quality of service, or privilege.

3. The method of claim 1, wherein the network has a protocol controlling access to the network, the contention signal being consistent with the protocol.

4. The method of claim 3, wherein the protocol uses one of in-band signals, out-of-band signals or independent channel signals to control access to the network.

5. The method of claim 1, wherein the adjusting comprises:
   monitoring an amount of unused capacity on the network; and
   asserting a contention signal in the network if the amount of unused capacity is less than a desired amount.

6. The method of claim 5, wherein the monitoring is performed by media access controllers (MACs) for each media of the network that requires access control, the media access controllers controlling a local reserve capacity of each respective media based on system parameters and monitoring data generated by each of the MACs.

7. The method of claim 6, further comprising:
   exchanging the monitoring data among the MACs; and
   asserting the contention signals in each of the media to achieve network performance requirements.

8. The method of claim 6, wherein a central regulation controller controls network traffic regulation, the method further comprising:
   receiving in the central traffic regulation controller the monitoring data generated by the MACs, and
   issuing traffic regulation commands from the central traffic regulation controller to the MACs to regulate traffic in each of the media to achieve network performance requirements.

9. The method of claim 6, wherein each of the MACs is one of a dedicated media access controller of an end-user that includes a media access function.

10. A network traffic regulation system, comprising:
    a network that includes media;
    said media having at least one protocol including a contention signal used to indicate that a particular user seeks access to the media;
    media access controllers (MACs); each of the MACs controlling one of more media of the network, each of the MACs
    (1) making unavailable an amount of media transmission capacity as reserve capacity, by blocking end-users from gaining access to the network by asserting the contention signal in a channel of the media controlled by each of the MACs, while no particular user seeks access to the media, and (2) adjusting the amount of reserve capacity based on a desired network performance.

11. The system of claim 10, wherein the contention signal blocks all end-users of the media or end-users of a specific class of the media, the class being defined by one or more of priority, quality of service, or privilege.

12. The system of claim 10, wherein the media has a protocol controlling access to the network, the contention signal being consistent with the protocol.

13. The system of claim 12, wherein the protocol uses one of in-band signals, out-of-band signals or independent channel signals to control access to the media.

14. The system of claim 10, wherein each of the MACs monitors an amount of unused capacity of a media controlled by each of the MACs, and asserts a contention signal in the media if the amount of unused capacity is less than a desired amount.

15. The system of claim 14, wherein each of the MACs controls a local reserve capacity based on system parameters and monitoring data generated by one of more of the MACs.

16. The system of claim 15, wherein each of the MACs exchanges the monitoring data with other ones of the MACs and asserts the contention signals in reach of the media to achieve network performance requirements.

17. The system of claim 15, further comprising a central traffic regulation controller that controls network traffic regulation, the central traffic regulation controller receives the monitoring data generated by the MACs, and issues traffic regulation commands to the MACs to regulate traffic in each of the media to achieve network performance requirements.

18. The system of claim 15, wherein each of the MACs is one of a dedicated media access controller or an end-user that includes a media access function.

* * * * *